(12) United States Patent
Wang et al.

(10) Patent No.: US 10,000,674 B1
(45) Date of Patent: Jun. 19, 2018

(54) POLYPROPYLENE BASED HOT-MELT ADHESIVE COMPOSITION

(71) Applicant: Borealis AG, Vienna (AT)

(72) Inventors: Jingbo Wang, Engerwitzdorf (AT); Carl-Gustaf Ek, Västra Frölunda (SE); Anil Sönmez, Vienna (AT); Klaus Bernreitner, Linz (AT); Norbert Reichelt, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 0 days. days.

(21) Appl. No.: 15/737,067

(22) PCT Filed: Jul. 27, 2016

(86) PCT No.: PCT/EP2016/067897
§ 371 (c)(1),
(2) Date: Dec. 15, 2017

(87) PCT Pub. No.: WO2017/017136
PCT Pub. Date: Feb. 2, 2017

(30) Foreign Application Priority Data

Jul. 30, 2015 (EP) ..................................... 15179158

(51) Int. Cl.
| | | |
|---|---|---|
| *C09J 123/14* | (2006.01) | |
| *C08F 10/06* | (2006.01) | |
| *C08F 10/04* | (2006.01) | |
| *C08K 5/00* | (2006.01) | |
| *C09D 191/08* | (2006.01) | |
| *C08L 91/06* | (2006.01) | |
| *C08K 3/36* | (2006.01) | |

(52) U.S. Cl.
CPC .............. *C09J 123/14* (2013.01); *C08F 10/04* (2013.01); *C08F 10/06* (2013.01); *C08K 3/36* (2013.01); *C08K 5/005* (2013.01); *C08K 5/0016* (2013.01); *C08K 5/0025* (2013.01); *C08K 5/0033* (2013.01); *C08K 5/0066* (2013.01); *C08L 91/06* (2013.01); *C09D 191/08* (2013.01); *C09J 2201/61* (2013.01); *C09J 2203/10* (2013.01)

(58) Field of Classification Search
CPC .. C09J 123/14; C09J 2203/10; C09J 2201/61; C08F 10/04; C08F 10/06; C09D 191/08; C08K 5/0016; C08K 5/0025; C08K 5/0033; C08K 5/005; C08K 5/0066; C08K 3/36; C08L 91/06
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 1/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 5,539,067 A | 7/1996 | Parodi et al. |
| 5,618,771 A | 4/1997 | Parodi et al. |
| 2009/0075104 A1* | 3/2009 | Tornatore ................ B32B 27/32 428/461 |
| 2009/0274921 A1* | 11/2009 | Ackermans et al. ... B32B 27/32 428/516 |

FOREIGN PATENT DOCUMENTS

| | | |
|---|---|---|
| EP | 45975 | 8/1981 |
| EP | 45976 | 8/1981 |
| EP | 45977 | 8/1981 |
| EP | 0 491 566 | 6/1992 |
| EP | 0 629 631 | 6/1994 |
| EP | 0 629 632 | 6/1994 |
| EP | 0 776 913 | 6/1997 |
| EP | 1 074 557 | 2/2001 |
| EP | 0887379 | 12/2004 |
| EP | 2610271 | 3/2013 |
| EP | 2886599 | 6/2015 |
| WO | WO8707620 | 12/1987 |
| WO | WO9219658 | 3/1992 |
| WO | WO9212182 | 7/1992 |
| WO | WO9219653 | 11/1992 |
| WO | WO9219659 | 11/1992 |
| WO | WO9221705 | 12/1992 |
| WO | WO9311165 | 6/1993 |
| WO | WO9311166 | 6/1993 |
| WO | WO9319100 | 9/1993 |
| WO | WO9532994 | 12/1995 |
| WO | WO9736939 | 10/1997 |
| WO | WO9812234 | 3/1998 |
| WO | 98/40331 | 9/1998 |
| WO | 99/12943 | 3/1999 |
| WO | WO9924478 | 5/1999 |
| WO | WO9924479 | 5/1999 |
| WO | WO9933842 | 7/1999 |

(Continued)

OTHER PUBLICATIONS

Busico, et al., "Microstructure of polypropylene," Progress in Polymer Science, vol. 26, 2001, pp. 443-533, Elsevier.

(Continued)

*Primary Examiner* — Nathan M Nutter
(74) *Attorney, Agent, or Firm* — Lowenstein Sandler LLP

(57) ABSTRACT

The invention relates to an adhesive composition wherein such composition comprises at least one polypropylene copolymer and wherein such adhesive composition has improved overall bond performance. It further relates to an article comprising said adhesive composition, as well as to a process for producing such article. It even further relates to the use of the adhesive composition in the preparation of an article.

20 Claims, No Drawings

(56) References Cited

FOREIGN PATENT DOCUMENTS

| WO | 99/42497 | 8/1999 |
|---|---|---|
| WO | 00/26266 | 5/2000 |
| WO | WO0068315 | 11/2000 |
| WO | 02/02575 | 1/2002 |
| WO | 02/02576 | 1/2002 |
| WO | WO03000754 | 1/2003 |
| WO | WO03000755 | 1/2003 |
| WO | WO03000756 | 1/2003 |
| WO | WO03000757 | 1/2003 |
| WO | WO2004000899 | 12/2003 |
| WO | WO2004029112 | 4/2004 |
| WO | WO2004111095 | 12/2004 |
| WO | WO2010009827 | 1/2010 |
| WO | WO2012007430 | 1/2012 |
| WO | WO2014014491 | 1/2014 |

OTHER PUBLICATIONS

Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134, Wiley InterScience.

Busico, et al., "Full Assignment of the 13C NMR Spectra of Regioregular Polypropylenes: Methyl and Methylene Region," Macromolecules, vol. 30, 1997, pp. 6251-6263, American Chemical Society.

Kakugo, et al., "C NMR Determination of Monomer Sequence Distribution in Ethylene-Propylene Copolymers Prepared with s—TiCL13—Al (C2H5)2C1," Macromolecules, vol. 15, 1982, pp. 1150-1152, American Chemical Society.

Cheng, H.N., "C NMR Analysis of Ethylene-Propylene Rubbers," Macromolecules, vol. 17, 1984, pp. 1950-1955, American Chemical Society.

Resconi, et al., "Selectivity in Propene Polymerization with Metallocene Catalysts," Chem. Rev., vol. 100, 2000, pp. 1253-1345, American Chemical Society.

Wang, et al., "Structural Analysis of Ethylene/Propylene Copolymers Synthesized with a Constrained Geometry Catalyst," Macromolecules, vol. 33, 2000, pp. 1157-1162, American Chemical Society.

Singh, et al., Triad Sequence Determination of Ethylene-Propylene Copolymers—Application of Quantitative 13C NMR, Polymer Testing, 29, 2009, pp. 475-479.

Zhou, et al., "A new decoupling method for accurate quantification of polyethylene copolymer composition and triad sequence distribution with 13C NMR," Journal of Magnetic Resonance, vol. 187, 2007, pp. 225-233, Elsevier.

International Search Report and Written Opinion for PCT/EP2016/067897 dated Oct. 13, 2016, 10 pages.

Randall, J. et al., "A Review of High Resolution Liquid 13Carbon Nuclear Magnetic Resonance Characterizations of Ethylene-Based Polymers," Rev. Macromol. Chem. Phys. 1989, C29, 201.

Klimke, K, et a. "Optimisaion and Application of Polyolefin Branch Quantification y Melt-State 13C NMR Spectroscopyt," Macromol. Chem. Phys. 2006; 207:382.

Parkinson, M., et al. "Effect of Branch Length on 13 C NMR Relaxation Properties in Molten Poly[ethylene-co-(a-olefin)] Model Systems," Macromol. Chem. Phys. 2007; 208:2128.

Pollard, M., et al. "Observation of Chain Branching in Polyethylene in the Solid State and Melt via 13C NMR Spectroscopy and Melt NMR Relaxation Time Measurements," Macromolecules 2004; 37: 813:825.

Filip, X., et al., "Heteronuclear Decoupling Under Fast MAS by a Rotor-Synchronized Hahn-Echo Pulse Train," Journal of Magnetic Resonance 176 (2005), 239-243.

Griffin, J.M., et al, "Low-Load Rotor-Synchronised Hahn-Echo Pulse train (RS-HEPT) 1H Decoupling in Solid-State NMR: factors affecting MAS Spin-Echo Dephasiing Times," Magnetic Resonance in Chemistry, 2007 45, S1, S198-S208.

Castignolles, P., et al., Detection and Quantification of Branching in Polyacrylates by Size-Exclusion Chromatography (SEC) and Melt-State 13C NMR Spectroscopy, Polymer 50 (2009) 2373-2383.

Extended European Search Report for 15179158.9 dated Feb. 2, 2016, 5 pages.

* cited by examiner

POLYPROPYLENE BASED HOT-MELT ADHESIVE COMPOSITION

CROSS-REFERENCE TO RELATED APPLICATION(S)

This application is a national phase of International Application No. PCT/EP2016/067897, filed on Jul. 27, 2016, which claims the benefit of European Patent Application No. 15179158.9, filed on Jul. 30, 2015. The contents of these applications are hereby incorporated by reference in their entirety.

The present invention relates to an adhesive composition comprising at least one polypropylene copolymer. It further relates to an article comprising the adhesive composition and to a process for producing said article. The invention also relates to the use of the adhesive composition in the preparation of an article.

A hot-melt adhesive composition is at room temperature a solid thermoplastic based composition that quickly melts upon heating and then sets to a firm bond upon cooling. A hot-melt adhesive composition offers the possibility of almost instantaneous bonding which makes it an excellent candidate in automated production processes.

Typically a hot-melt adhesive composition includes a polymer and other components like for example another polymer, a tackifying resin, a plasticizer, an additive and/or a filler. The polymer normally used in a hot-melt adhesive composition can be for example a polyolefin (ethylene- or propylene-based polymer), a functionalised polyolefin (ethylene or propylene copolymer with reactive groups), a styrene block copolymer, an ethylene vinyl acetate, etc.

Important characteristics of a hot-melt adhesive composition include softening temperature, hardness, migration and blooming, resistance to discoloration and compatibility with other materials. Depending on the final application an appropriate hot-melt adhesive composition is chosen so that it fulfils the requirements for that specific final application.

When choosing a hot-melt adhesive composition, the contribution of the polymer component is vital, in particular for the cohesion properties. The role of the polymer is to provide the backbone of the composition and provide the primary mechanical properties such as strength, both in tension and in shear, flexibility, elasticity, impact properties and the basis for the heat resistance of the hot-melt adhesive. In addition to the cohesion properties, the polymer contributes to the adhesion properties based on the polymer structure and chemistry. The combination of both good cohesion and good adhesion of the hot-melt composition, for a particular application and towards the substrates to be bonded, the bond and the practical adhesion properties, is very important for the function and performance of the bond.

The adhesion properties for a hot-melt adhesive composition are generally for a specific substrate/adhesive combination practically determined by the additional components in the composition, e.g. via tackifying resins. The adhesion properties are important; however the cohesion properties, which originate from the polymer component properties mainly, are practically even more important and enable the hot-melt adhesive to bring a durable solution to substrate movements and conditions appearing during the expected lifetime of the bonded component. This means that the bond could be kept intact and fit in a system component based on a substrate/adhesive combination, having structural integrity and properties enabling the bond to distribute and withstand the stresses and strains and enabling energy dissipation in practical use. The man skilled in the art knows that the dissipation of energy within the adhesive plays a key role in the cohesion properties of such adhesive i.e., when pulling or shearing apart two surfaces that were glued by means of an specific adhesive, the force which can be contributed to dissipation is normally considerably larger compared to the force due to the surface energy and/or a chemical bond between the substrate and the adhesive. Thus, better energy dissipation within the adhesive leads to better cohesion properties which then results in better overall bond performance (practical adhesion properties) of such adhesive.

Two key properties to determine the cohesive performance of a hot-melt adhesive composition are typically its flexibility and elasticity. Both properties can be determined based on the tensile properties of the composition or polymer, via the tensile strength, elongation properties and tensile E-modulus values. The elasticity is normally defined as the tendency of a material or article to return to its original shape after being deformed. For elastic materials this is often linked to the E-modulus and to properties measured up to the yield point of the material, e.g. the secant modulus of elasticity for any point on the curve up to the yield point of the material, and at the yield point corresponding to the ratio of tensile stress at yield/tensile elongation at yield.

An important elasticity measure at lower deformations for a hot-melt adhesive composition or polymer is the storage modulus (G') value determined from dynamic mechanical measurements, e.g. via DMTA (Dynamic Mechanical Thermal Analysis). A good flexibility and tailored elasticity level helps to reduce the pulling force per unit area and greatly reduces the chances of the crack propagating within a hot-melt adhesive composition. This means that it helps to distribute and dissipate the pulling force thereby decreasing the failure of the overall adhesion capability in a hot-melt adhesive composition. The elasticity modulus G' for the composition has, however, to be above a certain desired value for each specific application and substrates. Otherwise the adhesive substrate could not bring sufficient resistance towards external forces in order to keep the structural integrity of the component. For specific applications it is also important that the properties of the adhesive composition, reflecting the elasticity at higher deformations are above certain values. These values should not be exceeded during the service life of the final product. The elasticity at higher deformations can be determined in a stress-strain test as reflected by the tensile stress at yield as well as the tensile strain at yield.

The hot-melt adhesive composition is used in a wide variety of applications, for example in combination with nonwoven materials such as for example disposable diapers and sanitary napkins, packaging such as for example case and carton sealing, bookbinding, bottle labelling, woodworking, textile and pressure sensitive application such as for example tapes, films and labels.

Although present-day hot-melt adhesive compositions have a wide range of applications there are still limitations related to their heat resistance properties. Low heat resistance of hot-melt adhesive compositions makes them unsuitable for applications where the articles containing the hot-melt adhesive are used at high temperature.

Another limitation of present-day hot-melt adhesive compositions is the lack of a proper combination of heat resistance and improved overall bond performance.

WO2014/014491 describes a hot-melt adhesive composition comprising a polypropylene impact copolymer, an olefin based elastomer, a tackifyer, a plasticizer, and a stabilizer or antioxidant where the viscosity of the composition is equal or less than 20000 mPas at 163° C.

Although WO2014/014491 describes a hot-melt adhesive composition comprising a polypropylene impact copolymer, the claimed invention is not based on the mechanical properties of such polypropylene impact copolymer. It mentions that the polypropylene impact copolymer as such is not suitable to produce effective adhesive performance. Another disadvantage is that the claimed hot-melt adhesive composition comprises many components other than the polypropylene impact copolymer, thereby adding more complexity to the hot-melt adhesive composition and its production.

Therefore there still exists a need for a hot-melt adhesive composition with a proper combination of heat resistance, flexibility and elasticity, thus resulting in a hot-melt adhesive composition with improved overall bond performance.

The suitability for application at high temperature is reflected by the Vicat-A temperature. Vicat-A temperature stands for Vicat softening temperature which is the determination of the softening point for materials that have no definite melting point, such as polymers. A high Vicat-A temperature means a high heat resistance property of the polymer.

The above mentioned disadvantages of the prior art hot-melt adhesive composition have now been overcome by providing an adhesive composition comprising at least one polypropylene copolymer, wherein such polypropylene copolymer has:
  a) at least one comonomer selected from ethylene and/or $C_4$-$C_{12}$ alpha-olefin,
  b) a total comonomer content in the range of 4.5 to 20.0 wt %,
  c) Vicat-A temperature >80° C., as measured according to ISO 306,
  d) storage modulus (G'23) in the range of 100 to 1000 MPa as measured at 23° C. according to ISO 6721-02 and ISO 6721-07,
  e) melting temperature in the range of 120 to 160° C. as measured according to ISO 11357-3
and at least one of: a polymer other than the at least one polypropylene copolymer, a tackifying resin, a plasticizer, an additive and/or a filler.

Generally the polypropylene copolymer comprises units derived from propylene and at least one comonomer selected from ethylene and/or linear or branched $C_4$-$C_{12}$ alpha-olefin. Preferably the polypropylene copolymer comprises units derived from propylene, ethylene and optionally at least one comonomer selected from the group consisting of linear or branched $C_4$-$C_{12}$ alpha-olefin. More preferably the polypropylene copolymer comprises units derived from propylene, ethylene and optionally one comonomer selected from the group consisting of linear $C_4$-$C_{12}$ alpha-olefin. Even more preferably the polypropylene copolymer comprises units derived from propylene and at least ethylene and optionally one comonomer selected from the group consisting of 1-butene, 1-pentene, 1-hexene, 1-heptene, 1-octene, 1-nonene, 1-decene, 1-undecenene and 1-dodecene wherein 1-butene and 1-hexene are preferred. It is particularly preferred that the polypropylene copolymer consists of units derived from propylene, ethylene and 1-butene.

The polypropylene copolymer can be a polypropylene copolymer-1 (PC-1) or a polypropylene copolymer-2 (PC-2) as further described in this document.

The polypropylene copolymer for use in the adhesive composition according to the invention generally is produced in polymerisation processes and under conditions well-known to the man skilled in the art of making polypropylene copolymers. The polypropylene copolymer can be produced by copolymerising propylene with the comonomers in the amounts further described below. Generally a polymerisation catalyst will be present. The polymerisation catalyst typically comprises a transition metal compound and an activator. Suitable polymerisation catalysts known in the art include Ziegler-Natta catalysts and single site catalysts.

Generally a Ziegler-Natta type catalyst used for the polypropylene copolymer preparation will be a stereospecific, solid, high yield Ziegler-Natta catalyst component comprising as main components Mg, Ti and Cl. Generally, in addition to the solid catalyst component, at least one cocatalyst as well as at least one external donor will be used in the polymerisation process.

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

The solid catalyst usually also comprises at least one electron donor (internal electron donor) and optionally aluminum. Suitable external electron donors used in the polymerisation are well known in the art and include ethers, ketones, amines, alcohols, phenols, phosphines and silanes.

Examples of suitable Ziegler-Natta catalysts and components in the catalysts are described among others in WO87/07620, WO92/21705, WO93/11165, WO93/11166, WO93/19100, WO97/36939, WO98/12234, WO99/33842, WO03/000756, WO03/000757, WO03/000754, WO03/000755, WO2004/029112, EP2610271, WO2012/007430, WO92/19659, WO92/19653, WO92/19658, U.S. Pat. No. 4,382,019, U.S. Pat. No. 4,435,550, U.S. Pat. No. 4,465,782, U.S. Pat. No. 4,473,660, U.S. Pat. No. 4,560,671, U.S. Pat. No. 5,539,067, U.S. Pat. No. 5,618,771, EP45975, EP45976, EP45977, WO95/32994, U.S. Pat. No. 4,107,414, U.S. Pat. No. 4,186,107, U.S. Pat. No. 4,226,963, U.S. Pat. No. 4,347,160, U.S. Pat. No. 4,472,524, U.S. Pat. No. 4,522,930, U.S. Pat. No. 4,530,912, U.S. Pat. No. 4,532,313, U.S. Pat. No. 4,657,882, U.S. Pat. No. 4,581,342, U.S. Pat. No. 4,657,882.

Instead of using a Ziegler-Natta type catalyst it is also possible to use a single site catalyst in the polymerisation process. Preferably, the single site type catalyst is a metallocene catalyst. Such a catalyst generally comprises a transition metal compound which contains at least one substituted or non-substituted cyclopentadienyl, indenyl or fluorenyl ligand. Examples of suitable metallocene compounds are given, among others, in EP629631, EP629632, WO00/26266, WO02/002576, WO02/002575, WO99/12943, WO98/40331, EP776913, EP1074557 and WO99/42497.

The metallocene catalyst is generally used together with an activator. Suitable activators are metal alkyl compounds and especially aluminum alkyl compounds known in the art.

The process for copolymerising propylene with the comonomers previously described is known in the state of the art. Such a polymerisation process generally comprises at least one polymerisation stage however the polymerisation process can also comprise additional polymerisation stages. The polymerisation at each stage can be carried out in solution, slurry, fluidized bed, bulk or gas phase. In one particular embodiment the process contains at least one bulk reactor stage and at least one gas phase reactor stage, each stage comprising at least one reactor and all reactors being arranged in cascade. In one particularly preferred embodiment the polymerisation process comprises at least one bulk reactor and at least one gas phase reactor arranged in that order. In some preferred polymerisation processes the process comprises one bulk reactor and at least two gas phase reactors, e.g. two or three gas phase reactors. The process may further comprise pre- and post-reactors. Pre-reactors comprise typically pre-polymerisation reactors. In this kind of processes high polymerisation temperatures are generally used in order to achieve specific properties of the polymers. Typical temperatures in all processes are 70° C. or higher, preferably 80° C. or higher, more preferably 85° C. or higher. The high polymerisation temperatures as mentioned above can be applied either in some or all reactors of the reactor cascade.

A preferred process is a "loop-gas phase"-process, such as developed by *Borealis* and known as BORSTAR™ technology. Examples of this process are described in EP0887379, WO92/12182, WO2004/000899, WO2004/111095, WO99/24478, WO99/24479 and WO00/68315. A further preferred process is the slurry-gas phase process called Spheripol™ process.

The total amount of units derived from ethylene and $C_4$-$C_{12}$ alpha-olefins in the polypropylene copolymer generally is in the range of 4.5 to 20.0 wt %, preferably in the range of 5.0 to 19.0 wt %, more preferably in the range of 5.5 to 18.0 wt %. A suitable lower limit is 4.5 wt %, preferably 5.0 wt %, more preferably 5.5 wt %. A suitable upper limit is 20.0 wt %, preferably 19.0 wt %, more preferably 18.0 wt %. The lower and upper indicated values of the ranges are included. The total amount of units derived from ethylene and $C_4$-$C_{12}$ alpha-olefin in the polypropylene copolymer is calculated based on the total amount of monomers in the polypropylene copolymer.

The polypropylene copolymer generally has a Vicat-A temperature >80.0° C., preferably in the range of 81 to 125° C., more preferably in the range of 85 to 110° C., even more preferably in the range of 90 to 100° C. The Vicat-A temperature for the polypropylene copolymer is determined according to ISO 306.

Generally the polypropylene copolymer has a storage modulus (G'23) in the range of 100 to 1000 MPa, preferably in the range of 130 to 700 MPa, more preferably in the range of 150 to 600 MPa. The storage modulus (G'23) for the polypropylene copolymer is determined according to ISO 6721-02 and ISO 6721-07 at 23° C. A suitable lower limit is 100 MPa, preferably 130 MPa, more preferably 150 MPa. A suitable upper limit is 1000 MPa, preferably 700 MPa, more preferably 600 MPa. The lower and upper indicated values of the ranges are included The polypropylene copolymer generally has a melting temperature in the range of 120 to 160° C. as measured according to ISO 11357-3, preferably in the range of 122 to 155° C., more preferably in the range of 125 to 150° C. A suitable lower limit is 120° C., preferably 122° C., more preferably 125° C. A suitable upper limit is 160° C., preferably 155° C., more preferably 150° C. The lower and upper indicated values of the ranges are included.

Generally the polypropylene copolymer has a melt flow rate ($MFR_2$) in the range of 0.5 to 500 g/10 min. The $MFR_2$ for the polypropylene copolymer is determined according to ISO 1133, at a temperature of 230° C. and under a load of 2.16 kg. It is preferred that the polypropylene copolymer has an $MFR_2$ in the range of 1.0 to 400 g/10 min, more preferably in the range of 2.0 to 310 g/10 min, even more preferably 3.0 to 250 g/10 min. A suitable lower limit is 0.5 g/10 min, preferably 1.0 g/10 min, more preferably 2.0 g/10 min, even more preferably 3.0 g/10 min. A suitable upper limit is 500 g/10 min, preferably 400 g/10 min, more preferably 310 g/10 min, even more preferably 250 g/10 min. The lower and upper indicated values of the ranges are included.

Generally the polypropylene copolymer has a tensile modulus (E) in the range of 200 to 1000 MPa. The tensile modulus of the polypropylene copolymer is determined according to ISO 527-1 at 23° C. It is preferred that the polypropylene copolymer has a tensile modulus in the range of 250 to 950 MPa, more preferably in the range of 250 to 900 MPa. A suitable lower limit is 200 MPa, preferably 250 MPa. A suitable upper limit is 1000 MPa, preferably 950 MPa, more preferably 900 MPa. The lower and upper indicated values of the ranges are included.

The adhesive composition according to the present invention comprises at least one of: a polymer other than the at least one polypropylene copolymer, a tackifying resin, a plasticizer, an additive and/or a filler. Examples of polymers other than the at least one polypropylene copolymer are: high pressure polyethylene and co-polymers thereof, like low density polyethylene (LDPE), ethylene-vinyl acetate (EVA) and ethylene-acrylate co-polymers, low pressure polyethylene, like high density polyethylene (HDPE), medium density polyethylene (MDPE), linear low density polyethylene (LLDPE), very low density polyethylene (VLDPE), styrene-butadiene copolymer (SBC), styrene-ethylene/butylene-styrene (SEBS), polyolefin based plastomer (POP) and elastomers (POE), amorphous poly alpha-olefin (APAO) and wax. The term "wax" refers to an organic substance having an average molecular weight of <10000 g/mol, which is solid at normal temperature and becomes liquid when heated, and is commonly considered a "wax". There is not a particular limitation on the type of wax as long as the adhesive composition according to the invention can be obtained. Examples of known waxes are: micro crystalline wax, synthetic wax and paraffin wax.

Suitable ethylene-acrylate copolymers according to the present invention can be for example a copolymer of ethylene and methyl acrylate which is commercially available, e.g. from Dupont under the name Elvaloy™.

Suitable polyolefin based plastomer (POP) and elastomers (POE) according to the present invention can be any copolymer of ethylene and propylene or ethylene and $C_4$-$C_{10}$ alpha olefin which are commercially available, e.g. from Borealis Plastomers (NL) under the trade name Queo™, from DOW Chemical Corp. (USA) under the trade name Engage™ or Affinity™, or from Mitsui under the trade name Tafmer™.

Suitable amorphous poly alpha-olefins (APAO) according to the present invention can be any amorphous poly alpha-olefin commercially available, e.g. from Rextac under the name of Rextac™ or from Evonik under the name of Vestoplast™.

The tackifying resin can be a molecule or a macromolecule. Generally it is a chemical compound or a polymer of fairly low molecular weight, compared to common polymers. The polymer can be from a natural source or from a chemical process or combination thereof. The tackifying resin generally enhances the adhesion of a final adhesive composition.

The plasticizer comprised in the adhesive composition according to the present invention can be selected from: mineral based oil, petroleum based oil, liquid resin, liquid elastomer, polybutene, polyisobutene, phthalate plasticizer, benzoate plasticizer, epoxidized soya oil, vegetal oil, olefin oligomer, low molecular weight polymer, solid plasticizer and mixtures of any of them.

Examples of additives that can be used in the adhesive composition according to the present invention include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox™ MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer-Tropsch waxes, montan-based waxes, fluoro-based compounds, or paraffin waxes), nucleating agents (for example benzoates, phosphorous-based compounds, sorbitoles, nonitol-based compounds or amide-based compounds), as well as slip and antiblocking agents (for example erucamide, oleamide, natural silica and synthetic silica or zeolites) and mixtures thereof.

Examples of fillers suitable to be comprised in the adhesive composition according to the present invention include, but are not limited to talc, calcium carbonate, calcium sulphate, clay, kaolin, silica, glass, fumed silica, mica, wollastonite, feldspar, aluminium silicate, calcium silicate, alumina, hydrated alumina such as alumina trihydrate, glass microsphere, ceramic microsphere, wood flour, marble dust, magnesium oxide, magnesium hydroxide, antimony oxide, zinc oxide, barium sulphate and/or titanium dioxide. Here and hereinafter mineral modifiers are comprised in the term filler. The man skilled in the art of adhesive compositions can without undue burden easily determine the most appropriate amount of components in the adhesive composition for a certain application.

The invention also provides an adhesive composition according to the invention wherein the polypropylene copolymer is a polypropylene copolymer-1 (PC-1) having at least one comonomer selected from ethylene and/or a $C_4$-$C_{12}$ alpha-olefin and wherein such polypropylene copolymer-1 (PC-1) has a Flexibility >0.8 which is calculated according to the equation:

Flexibility=EAY*100000/(TSY*$E$)

wherein:
EAY is the elongation at yield value,
TSY is the tensile strength at yield value, in MPa and
E is the tensile modulus value, in MPa.

The polypropylene copolymer-1 (PC-1) comprises a matrix (M) being a random propylene copolymer (R-PP) and dispersed therein an elastomeric propylene copolymer (EL). Thus the matrix (M) generally contains (finely) dispersed inclusions being not part of the matrix (M) and said inclusions contain the elastomeric propylene copolymer (EL). The term inclusion indicates that the matrix (M) and the inclusion form different phases within the polypropylene copolymer-1 (PC-1). Preferably, the polypropylene copolymer-1 (PC-1) according to this invention comprises as polymer components only the random propylene copolymer (R-PP) and the elastomeric propylene copolymer (EL). In other words, the polypropylene copolymer-1 (PC-1) may contain additives but no other polymer in an amount exceeding 5.0 wt %, more preferably not exceeding 3.0 wt %, most preferably not exceeding 1.0 wt %, based on the total weight of polypropylene copolymer-1 (PC-1). One additional polymer which may be present in such low amount is a polyethylene which can be a reaction by-product obtained during the preparation of the polypropylene copolymer-1 (PC-1).

Generally the polypropylene copolymer-1 (PC-1), i.e. the random propylene copolymer (R-PP) and the elastomeric propylene copolymer (EL), comprises at least one monomer copolymerisable with propylene selected from ethylene and $C_4$-$C_{12}$ alpha-olefin, in particular selected from ethylene and $C_4$-$C_8$ alpha-olefin, e.g. 1-butene and/or 1-hexene. Preferably, the polypropylene copolymer-1 (PC-1) comprises, more preferably consists of, at least one monomer copolymerisable with propylene from the group consisting of ethylene, 1-butene and 1-hexene. More preferably, the polypropylene copolymer-1 (PC-1) comprises, apart from propylene, units derivable from ethylene and/or 1-butene. In an even more preferred embodiment, the polypropylene copolymer-1 (PC-1) comprises units derivable from ethylene and propylene only. Still more preferably the random propylene copolymer (R-PP) and the elastomeric propylene copolymer (EL) of the polypropylene copolymer-1 (PC-1) contain the same comonomers, like ethylene. Accordingly, the elastomeric propylene copolymer (EL) is preferably an ethylene propylene rubber (EPR), whereas the random propylene copolymer (R-PP) is a random ethylene propylene copolymer.

The polypropylene copolymer-1 (PC-1) can have a total comonomer content in the range of 4.5 to 20.0 wt %, preferably in the range of 5.5 to 20.0 wt %, more preferably in the range of 6.5 to 18.0 wt %. A suitable lower limit is 4.5 wt %, preferably 5.5 wt %, more preferably 6.5 wt %. A suitable upper limit is 20.0 wt %, preferably 18.0 wt %. The lower and upper indicated values of the ranges are included. The total comonomer content in the polypropylene copolymer-1 (PC-1) is calculated based on the total amount of monomers in the polypropylene copolymer-1 (PC-1).

The polypropylene copolymer-1 (PC-1) generally has an ethylene comonomer content in the range of 6.5 to 18.0 wt %, preferably in the range of 7.0 to 17.5 wt %, more preferably in the range of 7.5 to 17.0 wt %. A suitable lower limit is 6.5 wt %, preferably 7.0 wt %, more preferably 7.5 wt %. A suitable upper limit is 18.0 wt %, preferably 17.5 wt %, more preferably 17.0 wt %. The lower and upper indicated values of the ranges are included. The ethylene comonomer content in the polypropylene copolymer-1 (PC-1) is calculated based on the total amount of monomers in the polypropylene copolymer-1 (PC-1).

The polypropylene copolymer-1 (PC-1) generally has a Flexibility >0.8 which is calculated according to the equation:

Flexibility=EAY*100000/(TSY*$E$)

wherein:
EAY is the elongation at yield value,
TSY is the tensile strength at yield value, in MPa and
E is the tensile modulus value, in MPa.

The polypropylene copolymer-1 (PC-1) generally has a Flexibility >0.8, preferably in the range of 0.8 to 20, more preferably in the range of 0.9 to 15.

The polypropylene copolymer-1 (PC-1) generally has a glass transition temperature $T_{g1}$ in the range of −12 to −2° C., preferably in the range of −10 to −3° C. A suitable lower limit is −12° C., preferably −10° C. A suitable upper limit is −2° C., preferably −3° C. The lower and upper indicated values of the ranges are included.

The polypropylene copolymer-1 (PC-1) generally has a glass transition temperature $T_{g2}$ in the range of −65 to −20°

C., preferably in the range of −60 to −25° C., more preferably in the range of −58 to −30° C. A suitable lower limit is −65° C., preferably −60° C., more preferably −58° C. A suitable upper limit is −20° C., preferably −25° C., more preferably −30° C. The lower and upper indicated values of the ranges are included.

Generally the polypropylene copolymer-1 (PC-1) has a storage modulus (G'23) in the range of 150 to 450 MPa, preferably in the range of 170 to 400 MPa. The storage modulus (G'23) for the polypropylene copolymer-1 (PC-1) is determined according to ISO 6721-02 and ISO 6721-07 at 23° C. A suitable lower limit is 150 MPa, preferably 170 MPa. A suitable upper limit is 450 MPa, preferably 400 MPa. The lower and upper indicated values of the ranges are included.

The polypropylene copolymer-1 (PC-1) generally has a melting temperature in the range of 135 to 155° C. as measured according to ISO 11357-3, preferably in the range of 137 to 153° C. A suitable lower limit is 135° C., preferably 137° C. A suitable upper limit is 155° C., preferably 153° C. The lower and upper indicated values of the ranges are included.

The polypropylene copolymer-1 (PC-1) generally has a tensile modulus (E) in the range of 200 to 1000 MPa. It is preferred that the polypropylene copolymer-1 (PC-1) has a tensile modulus in the range of 250 to 950 MPa, more preferably in the range of 250 to 900 MPa. A suitable lower limit is 200 MPa, preferably 250 MPa. A suitable upper limit is 1000 MPa, preferably 950 MPa, more preferably 900 MPa. The lower and upper indicated values of the ranges are included.

Generally the xylene cold soluble (XCS) fraction of the polypropylene copolymer-1 (PC-1), measured according to ISO 16152 at 25° C., is in the range of 15.0 to 50.0 wt %, preferably in the range from 17.0 to 48.0 wt %, more preferably in the range from 18.0 to 47.0 wt %. A suitable lower limit is 15.0 wt %, preferably 17.0 wt %, more preferably 18.0 wt %. A suitable upper limit is 50.0 wt %, preferably 48.0 wt %, more preferably 47.0 wt %. The lower and upper indicated values of the ranges are included.

Generally the xylene cold soluble fraction (XCS) of the polypropylene copolymer-1 (PC-1) has an intrinsic viscosity (IV) in the range of 1.0 to 4.5 dl/g, preferably in the range of 1.0 to 2.7 dl/g, more preferably in the range of 1.0 to 2.0 dl/g. A suitable lower limit is 1.0 dl/g. A suitable upper limit is 4.5 dl/g, preferably 2.7 dl/g, more preferably 2.0 dl/g. The lower and upper indicated values of the ranges are included.

Generally the polypropylene copolymer-1 (PC-1) has a melt flow rate ($MFR_2$) in the range of 0.8 to 90 g/10 min. The $MFR_2$ for the polypropylene copolymer-1 (PC-1) is determined according to ISO 1133, at a temperature of 230° C. and under a load of 2.16 kg. It is preferred that the polypropylene copolymer-1 (PC-1) has an $MFR_2$ in the range of 0.8 to 40 g/10 min, more preferably in the range of 0.8 to 25 g/10 min, even more preferably in the range of 0.8 to 15 g/10 min. A suitable lower limit is 0.8 g/10 min A suitable upper limit is 90 g/10 min, preferably 40 g/10 min, more preferably 25 g/10 min, even more preferably 15 g/10 min. The lower and upper indicated values of the ranges are included.

The present invention also provides an adhesive composition according to the invention wherein the polypropylene copolymer is a polypropylene copolymer-2 (PC-2) having ethylene as a comonomer and at least one selected from $C_4$-$C_{12}$ alpha-olefin and wherein such polypropylene copolymer-2 (PC-2) has:

a) a glass transition temperature $T_g$ in the range of −12 to 0° C. and
b) a total comonomer content in the range of 6.0 to 15.0 wt %.

The polypropylene copolymer-2 (PC-2) comprises units derived from propylene, ethylene and at least one comonomer selected from linear or branched $C_4$-$C_{12}$ alpha-olefin. Preferably the polypropylene copolymer-2 (PC-2) comprises units derived from propylene, ethylene and at least one comonomer selected from the group consisting of linear $C_4$-$C_{12}$ alpha-olefin. More preferably the polypropylene copolymer-2 (PC-2) comprises units derived from propylene, ethylene and at least one comonomer selected from the group consisting of linear polymer of 1-butene, 1-pentene, 1-hexene, 1-heptene, 1-octene, 1-nonene, 1-decene, 1-undecene and 1-dodecene, wherein 1-butene and 1-hexene are preferred. Preferably the polypropylene copolymer-2 (PC-2) consists of units derived from propylene, ethylene and one comonomer selected from the group consisting of linear polymer of 1-butene, 1-pentene, 1-hexene, 1-heptene, 1-octene, 1-nonene, 1-decene, 1-undecene and 1-dodecene, wherein 1-butene and 1-hexene are preferred. It is particularly preferred that the polypropylene copolymer-2 (PC-2) consists of units derived from propylene, ethylene and a $C_4$-alpha olefin. The $C_4$-alpha olefin can be a branched or linear $C_4$-alpha olefin, preferably linear $C_4$-alpha olefin, i.e. 1-butene.

The total amount of units derived from ethylene and $C_4$-$C_{12}$ alpha-olefins in the polypropylene copolymer-2 (PC-2) is generally in the range of 6.0 to 15.0 wt %, preferably in the range of 6.0 to 14.5 wt %, more preferably in the range of 6.0 to 12.0 wt %. A suitable lower limit is 6.0 wt %. A suitable upper limit is 15.0 wt %, preferably 14.5 wt %, more preferably 12.0 wt %. The lower and upper indicated values of the ranges are included. The total amount of units derived from ethylene and $C_4$-$C_{12}$ alpha-olefin in the polypropylene copolymer-2 (PC-2) is calculated based on the total amount of monomers in the polypropylene copolymer-2 (PC-2).

In the particularly preferred embodiment where the polypropylene copolymer-2 (PC-2) consists of units derived from propylene, ethylene and $C_4$-alpha olefin, wherein the $C_4$-alpha olefin is generally a branched or linear $C_4$-alpha olefin, preferably linear $C_4$-alpha olefin, i.e. 1-butene:

a) the ethylene content in the polypropylene copolymer-2 (PC-2) is generally in the range of 0.5 to 3.0 wt %, preferably in the range of 0.6 to 2.5 wt %, more preferably in the range of 0.8 to 2.0 wt %. A suitable lower limit is 0.5 wt %, preferably 0.6 wt %, more preferably 0.8 wt %. A suitable upper limit is 3.0 wt %, preferably 2.5 wt %, more preferably 2.0 wt %. The lower and upper indicated values of the ranges are included. The amount of units derived from ethylene in the polypropylene copolymer-2 (PC-2) is calculated based on the total amount of monomers in the polypropylene copolymer-2 (PC-2).

b) the $C_4$-alpha olefin content in the polypropylene copolymer-2 (PC-2) is generally in the range of 5.0 to 14.0 wt %, preferably in the range of 5.2 to 13.0 wt %, more preferably in the range of 5.5 to 12.0 wt %. A suitable lower limit is 5.0 wt %, preferably 5.2 wt %, more preferably 5.5 wt %. A suitable upper limit is 14.0 wt %, preferably 13.0 wt %, more preferably 12.0 wt %. The lower and upper indicated values of the ranges are included. The $C_4$-alpha olefin content in the polypropylene copolymer-2 (PC-2) is calculated based on the total amount of monomers in the polypropylene copolymer-2 (PC-2).

The polypropylene copolymer-2 (PC-2) generally has a glass transition temperature $T_g$ in the range of −12 to 0° C., preferably in the range of −10 to 0, more preferably in the range of −8 to −1. A suitable lower limit is −12° C., preferably −10° C., more preferably −8° C. A suitable upper limit is 0° C., preferably −1° C. The lower and upper indicated values of the ranges are included.

Generally the polypropylene copolymer-2 (PC-2) has a storage modulus (G'23) in the range of 300 to 600 MPa, preferably in the range of 300 to 550 MPa, more preferably in the range of 300 to 500 MPa. The storage modulus (G'23) for the polypropylene copolymer-1 (PC-1) is determined according to ISO 6721-02 and ISO 6721-07 at 23° C. A suitable lower limit is 300 MPa. A suitable upper limit is 600 MPa, preferably 550 MPa, more preferably 500 MPa. The lower and upper indicated values of the ranges are included.

The polypropylene copolymer-2 (PC-2) generally has a melting temperature in the range of 125 to 135° C. as measured according to ISO 11357-3, preferably in the range of 127 to 134° C., more preferably in the range of 129 to 132° C. A suitable lower limit is 125° C., preferably 127° C., more preferably 129° C. A suitable upper limit is 135° C., preferably 134° C., more preferably 132° C. The lower and upper indicated values of the ranges are included.

The polypropylene copolymer-2 (PC-2) generally has a tensile modulus (E) in the range of 500 to 1000 MPa. It is preferred that the polypropylene copolymer-2 (PC-2) has a tensile modulus in the range of 550 to 950 MPa, more preferably in the range of 600 to 900 MPa. A suitable lower limit is 500 MPa, preferably 550 MPa, more preferably 600 MPa. A suitable upper limit is 1000 MPa, preferably 950 MPa, more preferably 900 MPa. The lower and upper indicated values of the ranges are included.

The polypropylene copolymer-2 (PC-2) generally has a Flexibility >0.60 which is calculated according to the equation:

$$\text{Flexibility}=EAY*100000/(TSY*E)$$

wherein:
EAY is the elongation at yield value,
TSY is the tensile strength at yield value, in MPa and
E is the tensile modulus value, in MPa.

The polypropylene copolymer-2 (PC-2) generally has a Flexibility >0.60, preferably >0.65, more preferably >0.70.

Generally the polypropylene copolymer-2 (PC-2) has a melt flow rate ($MFR_2$) in the range of 2.0 to 500 g/10 min. The $MFR_2$ for the polypropylene copolymer-2 (PC-2) is determined according to ISO 1133, at a temperature of 230° C. and under a load of 2.16 kg. It is preferred that the polypropylene copolymer-2 (PC-2) has an $MFR_2$ in the range of 3.0 to 400 g/10 min, more preferably in the range of 5.0 to 350 g/10 min. A suitable lower limit is 2.0 g/10 min, preferably 3.0 g/10 min, more preferably 5.0 g/10 min A suitable upper limit is 500 g/10 min, preferably 400 g/10 min, more preferably 350 g/10 min. The lower and upper indicated values of the ranges are included.

In another embodiment of the present invention the adhesive composition comprises at least one polymer other than the at least one polypropylene copolymer next to the at least one polypropylene copolymer according to the invention.

In this embodiment, the present invention is concerned with an adhesive composition according to the invention wherein the at least one polymer other than the at least one polypropylene copolymer has
a) melting temperature<120° C. as measured according to ISO 11357-3,
b) storage modulus (G'23)<50 MPa as measured at 23° C. according to ISO 6721-02 and ISO 6721-07,
c) density <0.96 g/cm³ as measured according to ISO 1183D and
d) an $MFR_2$ in the range of 0.20 to 2000 g/10 min as measured according to ISO 1133.

The at least one polymer other than the at least one polypropylene copolymer generally has a melting temperature <120° C. as measured according to ISO 11357-3, preferably <110° C., more preferably <100° C.

Generally the at least one polymer other than the at least one polypropylene copolymer has a storage modulus (G'23) <50 MPa, preferably <45 MPa, more preferably <40 MPa. The storage modulus (G'23) for the polypropylene copolymer-1 (PC-1) is determined according to ISO 6721-02 and ISO 6721-07 at 23° C.

The at least one polymer other than the at least one polypropylene copolymer generally has a density <0.96 g/cm³, preferably in the range of 0.86 to 0.95 g/cm³, more preferably in the range of 0.87 to 0.95 g/cm³.

The at least one polymer other than the at least one polypropylene copolymer generally has a melt flow rate ($MFR_2$) between 0.2 and 2000 g/10 min. The $MFR_2$ for the at least one polymer other than the at least one polypropylene copolymer is determined according to ISO 1133 under a load of 2.16 kg. The temperature used in the determination of the $MFR_2$ depends on the nature of the at least one polymer other than the at least one polypropylene copolymer as well-known to the man skilled in the art. For example polyethylene is measured at 190° C. It is preferred that the at least one polymer other than the at least one polypropylene copolymer has an $MFR_2$ in the range of 0.5 to 1500 g/10 min, more preferably in the range of 1.0 to 1000 g/10 min. A suitable lower limit is 0.2 g/10 min, preferably 0.5 g/10 min, more preferably 1.0 g/10 min A suitable upper limit is 2000 g/10 min, preferably 1500 g/10 min more preferably 1000 g/10 min. The lower and upper indicated values of the ranges are included.

In this embodiment, the present invention is also concerned with an adhesive composition according to the invention wherein such adhesive composition has:
a) at least one polymer other than the at least one polypropylene copolymer present in the range of 0.01 to 50.0 wt %, said percentage of the at least one polymer other than the at least one polypropylene copolymer being calculated based on the total amount of polypropylene copolymer and of at least one polymer other than the at least one polypropylene copolymer comprised in the adhesive composition and
b) Flexibility >0.5 which is calculated according to the equation:

$$\text{Flexibility}=EAY*100000/(TSY*E)$$

wherein:
EAY is the elongation at yield value,
TSY is the tensile strength at yield value, in MPa and
E is the tensile modulus value, in MPa.

In this embodiment the amount of the at least one polymer other than the at least one polypropylene copolymer present in the adhesive composition according to the invention is generally in the range of 0.01 to 50.0 wt %, preferably in the range of 3.0 to 45.0 wt %, more preferably in the range of 5.0 to 40.0 wt %. A suitable lower limit is 0.01 wt %, preferably 3.0 wt %, more preferably 5.0 wt %. A suitable upper limit is 50.0 wt %, preferably 45.0 wt %, more preferably 40.0 wt %. The lower and upper indicated values of the ranges are included. The percentage of at least one polymer other than the at least one polypropylene copolymer is calculated based on the total amount of polypropylene copolymer and of at least one polymer other than the at least one polypropylene copolymer comprised in the adhesive composition.

In this embodiment the adhesive composition according to the invention generally has a Flexibility >0.5, preferably >0.55, more preferably >0.6, even more preferably >0.7, still even more preferably >0.8.

The present invention is also concerned with an adhesive composition according to the invention wherein such adhesive composition comprises:
 a) at least one polypropylene copolymer in the range of 10.0 to 80.0 wt %,
 b) at least one polymer other than the at least one polypropylene copolymer in the range of 0.0 to 50.0 wt %,
 c) a tackifying resin in a range of 0.0 to 70.0 wt %,
 d) a plasticizer in a range of 0.0 to 60.0 wt %,
 e) an additive in a range of 0.1 to 4.0 wt % and or
 f) a filler in a range of 0.0 to 50.0 wt %
said percentages of the at least one polypropylene copolymer, the at least one polymer other than the at least one polypropylene copolymer, tackifying resin, plasticizer, additive and filler being calculated based on the total amount of adhesive composition.

The amount of the at least one polypropylene copolymer present in the adhesive composition according to the invention generally is in the range of 10.0 to 80.0 wt %, preferably in the range of 15.0 to 75.0 wt %, more preferably in the range of 25.0 to 65.0 wt %. A suitable lower limit is 10.0 wt %, preferably 15.0 wt %, more preferably 25.0 wt %. A suitable upper limit is 80.0 wt %, preferably 75.0 wt %, more preferably 65.0 wt %. The lower and upper indicated values of the ranges are included. The percentage of the at least one polypropylene copolymer in this adhesive composition is calculated based on the total amount of adhesive composition.

The amount of the at least one polymer other than the at least one polypropylene copolymer present in the adhesive composition according to the invention is generally in the range of 0.0 to 50.0 wt %, preferably in the range of 3.0 to 40.0 wt %, more preferably in the range of 5.0 to 35.0 wt %. A suitable lower limit is 0.0 wt %, preferably 3.0 wt %, more preferably 5.0 wt %. A suitable upper limit is 50.0 wt %, preferably 40.0 wt %, more preferably 35.0 wt %. The lower and upper indicated values of the ranges are included. The percentage of the at least one polymer other than the at least one polypropylene copolymer in this adhesive composition is calculated based on the total amount of adhesive composition.

The amount of tackifying resin present in the adhesive composition according to the invention is generally in the range of 0.0 to 70.0 wt %, preferably in the range of 10.0 to 60.0 wt %, more preferably in the range of 15.0 to 55.0 wt %. A suitable lower limit is 0.0 wt %, preferably 10.0 wt %, more preferably 15.0 wt %. A suitable upper limit is 70.0 wt %, preferably 60.0 wt %, more preferably 55.0 wt %. The lower and upper indicated values of the ranges are included. The percentage of tackifying resin in this adhesive composition is calculated based on the total amount of adhesive composition.

The amount of plasticizer present in the adhesive composition according to the invention is generally in the range of 0.0 to 60.0 wt %, preferably in the range of 3.0 to 55.0 wt %, more preferably in the range of 5.0 to 45.0 wt %. A suitable lower limit is 0.0 wt %, preferably 3.0 wt %, more preferably 5.0 wt %. A suitable upper limit is 60.0 wt %, preferably 55.0 wt %, more preferably 45.0 wt %. The lower and upper indicated values of the ranges are included. The percentage of plasticizer in this adhesive composition is calculated based on the total amount of adhesive composition.

The amount of additive present in the adhesive composition according to the invention is generally in the range of 0.1 to 4.0 wt %, preferably in the range of 0.15 to 3.0 wt %, more preferably in the range of 0.20 to 2.0 wt %. A suitable lower limit is 0.1 wt %, preferably 0.15 wt %, more preferably 0.20 wt %. A suitable upper limit is 4.0 wt %, preferably 3.0 wt %, more preferably 2.0 wt %. The lower and upper indicated values of the ranges are included. The percentage of additive in this adhesive composition is calculated based on the total amount of adhesive composition.

The amount of filler in the adhesive composition according to the invention is generally in the range of 0.0 to 50.0 wt %, preferably in the range of 0.5 to 40.0 wt %, more preferably in the range of 1.0 to 30.0 wt %. A suitable lower limit is 0.0 wt %, preferably 0.5 wt %, more preferably 1.0 wt %. A suitable upper limit is 50.0 wt %, preferably 40.0 wt %, more preferably 30.0 wt %. The lower and upper indicated values of the ranges are included. The percentage of filler in this adhesive composition is calculated based on the total amount of adhesive composition.

As mentioned before, the components described above can be comprised in the adhesive composition according to the invention. The man skilled in the art of adhesive compositions can, without undue burden, easily determine the most appropriate type and amount of components for a certain application.

The present invention is also concerned with a process to prepare an adhesive composition according to the invention by combining at least one polypropylene copolymer with at least one of: a polymer other than the at least one polypropylene copolymer, a tackifying resin, a plasticizer, an additive and/or a filler.

The inventive adhesive composition can be prepared using any of the techniques known by the man skilled in the art. An illustrative example of the adhesive composition preparation is a mixing procedure involving the placement of all the components, except the polypropylene copolymer in a jacketed mixing kettle equipped with a rotor and thereafter applying a temperature in a range of 149 to 190° C. to melt the components placed in the jacketed mixing kettle. It should be understood that the precise temperature to be used in this preparation step should depend on the melting points of the particular components. The polypropylene copolymer is subsequently introduced in the jacked mixing kettle under agitation allowing the mixing to continue until a consistent and uniform mixture is formed. The adhesive composition preparation may be carried out under inert atmosphere, by using an inert gas such as carbon dioxide or nitrogen, in order to protect said adhesive composition.

The resulting adhesive composition may then be applied to substrates using a variety of coating techniques. Examples of coating techniques are: hot-melt slot die coating, hot-melt wheel coating, hot-melt roller coating, melt-blown coating and spiral spray coating. Any application temperature at which the adhesive composition is applied on a substrate, above the softening point of the adhesive composition is suitable. The softening point of a material is the temperature at which a material softens sufficiently to allow significant flow under a low stress. For the adhesive composition according to this invention, the application temperature is preferably selected to be above the melting point of the main polypropylene copolymer component. Alternatively, the application temperature can be selected to be above the melting point of the polypropylene copolymer component with the highest melting point in the composition. A suitable application temperature range for the adhesive composition would be between 120° C. and 220° C. depending on the type of polypropylene copolymer comprised in such composition. Preferably the application temperature is selected to be in the range from 1° C. to 30° C., more preferably in a range from 2° C. to 25° C., preferably in a range from 3° C. to 20° C. above the melting point of the polypropylene copolymer component with the highest melting point in the composition.

The substrate can be made out of one or more different substrate materials, for example nonwoven material, polymeric material, elastomeric material, wood, glass, paper, carton, concrete and ceramic material. The substrate can be in the form of for example a fiber, a film, a thread, a strip, a coating, a foil, a sheet, a board, a plate and a band. Any substrate material and any substrate form could be used in any combination possible with the adhesive composition serving to bond two or more substrates together.

The present invention is further concerned with an article comprising the adhesive composition according to the invention and at least one substrate.

Such article comprising the adhesive composition according to the invention and the at least one substrate can be used in several applications. Illustrative applications of such an article include, but are not limited to, medical application, construction application, nonwoven material application, food or general packaging application, bookbinding application, bottle labelling application and pressure sensitive application.

Such article comprising the adhesive composition according to the invention and at least one substrate can be chosen from a disposable diaper, a sanitary napkin, a bed pad, a bandage, a surgical drape, a tape, a film, a label, a sheet (for example a plastic, a paper or a nonwoven sheet), a bottle (for example a plastic or glass bottle), a can, a board (for example a cardboard or a wooden board), a case, a wooden part, a book, a bag, a surgical drape, a surgical device, a medical device, a filter or a package (for example a box or a container). Preferred articles according to the invention are tapes, films, books and medical devices.

The present invention is also concerned with a process to produce an article according to the invention wherein the process comprises at least the step of applying at least one adhesive composition according to the invention on at least one surface of the at least one substrate.

Finally the present invention is also directed to the use of the adhesive composition according to the invention in the preparation of an article according to the invention.

EXAMPLES

I—Measuring Methods

The following definitions of terms and determination methods apply for the above general description of the invention as well as to the below examples unless otherwise defined.

a) Vicat-A Temperature Measurement

The Vicat-A temperature is determined according to ISO 306 (A50) using injection moulded test specimens having the following dimensions: 80×10×4 mm. The injection moulded test specimens are prepared as described in EN ISO 1873-2.

b) Melt Flow Rate

The melt flow rate ($MFR_2$) is determined according to ISO 1133 and is indicated in g/10 min. The $MFR_2$ is an indication of the flowability and hence the processability of the polymer. The higher the melt flow rate, the lower the viscosity of the polymer. The $MFR_2$ of polypropylene is determined at a temperature of 230° C. and under a load of 2.16 kg. The $MFR_2$ of polyethylene, of polyolefin based plastomer (POP) and of elastomer (POE) is determined at a temperature of 190° C. and under a load of 2.16 kg.

c) DSC Analysis

The melting temperature ($T_m$) and the crystallisation temperature ($T_c$) were measured with a TA Instrument Q2000 differential scanning calorimetry device (DSC) according to ISO 11357/3 on 5 to 10 mg samples. Crystallisation (TO and melting temperatures ($T_m$) were obtained in a heat/cool/heat cycle with a scan rate of 10° C./min between 30° C. and 225° C. Melting ($T_m$) and crystallisation ($T_c$) temperatures were taken as the peaks of the endotherms and exotherms in the cooling cycle and the second heating cycle respectively.

d) Xylene Cold Soluble (XCS)

The content of xylene cold soluble (XCS) is determined at 25° C. according to ISO 16152; fifth edition; 2005-07-01. The part which remains insoluble is the xylene cold insoluble (XCI) fraction.

e) Intrinsic Viscosity (IV)

The intrinsic viscosity (IV) is measured according to ISO 1628/1, in decalin at 135° C. The intrinsic viscosity (IV) value increases with the molecular weight of a polymer.

f) Density

The density is measured according to ISO 1183D. The samples preparation is carried out by compression moulding according to ISO 1872-2:2007.

g) Dynamic Mechanical Thermal Analysis (DMTA)

The storage modulus G' and the glass transition temperature $T_g$ were measured by DMTA analysis. The DMTA evaluation and the storage modulus G' measurements were carried out in torsion mode on compression moulded samples at temperature between −130° C. and +150° C. using a heating rate of 2° C./min and a frequency of 1 Hz, according to ISO 6721-02 and ISO 6721-07. The measurements were carried out using an Anton Paar MCR 301 equipment. The compressed moulded samples have the following dimensions: 40×10×1 mm and are prepared in accordance to ISO 1872-2:2007. The storage modulus G'23 and G'70 were measured at 23° C. and 70° C. respectively.

h) Tensile Properties

The tensile properties, the elongation at break (EAB), elongation at yield (EAY), tensile strength at break (TSB) and tensile strength at yield (TSY) were measured at 23° C. according to ISO 527-1:2012/ISO 527-2:2012 on injection moulded specimens, type 1B, prepared according to ISO 527-2:2012 and using an extensometer (Method B) produced according to ISO 1873-2 with 4 mm sample thickness. The test speed was 50 mm/min, except for the tensile modulus (E) measurement which was carried out at a test speed of 1 mm/min.

i) Comonomer Content

Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}C\{^1H\}$ NMR spectra were recorded in the solution-state using a Bruker Advance III 400 NMR spectrometer operating at 400.15 and 100.62 MHz for $^1H$ and $^{13}$C respectively. All spectra were recorded using a $^{13}$C optimised 10 mm extended temperature probe head at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

Bibliographic References:
1—Busico, V., Cipullo, R., Prog. Polym. Sci. 26 (2001) 443.
2—Busico, V., Cipullo, R., Monaco, G., Vacatello, M., Segre, A. L., Macromoleucles 30 (1997) 6251.
3—Zhou, Z., Kuemmerle, R., Qiu, X., Redwine, D., Cong, R., Taha, A., Baugh, D. Winniford, B., J. Mag. Reson. 187 (2007) 225.
4—Busico, V., Carbonniere, P., Cipullo, R., Pellecchia, R., Severn, J., Talarico, G., Macromol. Rapid Commun. 2007, 28, 1128.
5—Resconi, L., Cavallo, L., Fait, A., Piemontesi, F., Chem. Rev. 2000, 100, 1253.
6—Wang, W-J., Zhu, S., Macromolecules 33 (2000), 1157.
7—Cheng, H. N., Macromolecules 17 (1984), 1950.
8—Singh, G., Kothari, A., Gupta, V., Polymer Testing 28 5 (2009), 475.
9—Kakugo, M., Naito, Y., Mizunuma, K., Miyatake, T. Macromolecules 15 (1982) 1150.
10—Randall, J. Macromol. Sci., Rev. Macromol. Chem. Phys. 1989, C29, 201.

Comonomer Content Poly(Propylene-Co-Ethylene-Co-Butene)

Quantitative $^{13}$C{$^1$H} NMR spectra recorded in the molten-state using a Bruker Advance III 500 NMR spectrometer operating at 500.13 and 125.76 MHz for $^1$H and $^{13}$C respectively. All spectra were recorded using a $^{13}$C optimised 7 mm magic-angle spinning (MAS) probe head at 180° C. using nitrogen gas for all pneumatics. Approximately 200 mg of material was packed into a 7 mm outer diameter zirconia MAS rotor and spun at 4.5 kHz. This setup was chosen primarily for the high sensitivity needed for rapid identification and accurate quantification {1, 2, 6} Standard single-pulse excitation was employed utilising the NOE at short recycle delays {3, 1} and the RS-HEPT decoupling scheme {4, 5}. A total of 1024 (1 k) transients were acquired per spectra.

Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to regio defects were not observed {11}. The amount of propene was quantified based on the main Sαα methylene sites at 44.1 ppm:

$$P\text{total}=I_{S\alpha\alpha}$$

Characteristic signals corresponding to the incorporation of 1-butene were observed and the comonomer content quantified in the following way. The amount isolated 1-butene incorporated in PPBPP sequences was quantified using the integral of the αB2 sites at 44.1 ppm accounting for the number of reporting sites per comonomer:

$$B=I_{\alpha B2}/2$$

The amount consecutively incorporated 1-butene in PPBBPP sequences was quantified using the integral of the ααB2 site at 40.5 ppm accounting for the number of reporting sites per comonomer:

$$BB=2*L_{\alpha\alpha B2}$$

The total 1-butene content was calculated based on the sum of isolated and consecutively incorporated 1-butene:

$$B\text{total}=B+BB$$

The total mole fraction of 1-butene in the polymer was then calculated as:

$$fB=(B\text{total}/(E\text{total}+P\text{total}+B\text{total})$$

Characteristic signals corresponding to the incorporation of ethylene were observed and the comonomer content quantified in the following way. The amount isolated ethylene incorporated in PPEPP sequences was quantified using the integral of the Sαγ sites at 37.9 ppm accounting for the number of reporting sites per comonomer:

$$E=I_{S\alpha\gamma}/2$$

With no sites indicative of consecutive incorporation observed the total ethylene comonomer content was calculated solely on this quantity:

$$E\text{total}=E$$

The total mole fraction of ethylene in the polymer was then calculated as:

$$fE=(Etotal/(Etotal+Ptotal+Btotal)$$

The mole percent comonomer incorporation was calculated from the mole fractions:

$$B[\text{mol }\%]=100*fB$$

$$E[\text{mol }\%]=100*fE$$

The weight percent comonomer incorporation was calculated from the mole fractions:

$$B[\text{wt }\%]=100*(fB*56.11)/((fE*28.05)+(fB*56.11)+((1-(fE+fB))*42.08))$$

$$E[\text{wt }\%]=100*(fE*28.05)/((fE*28.05)+(fB*56.11)+((1-(fE+fB))*42.08))$$

Bibliographic References:
1—Klimke, K., Parkinson, M., Piel, C., Kaminsky, W., Spiess, H. W., Wilhelm, M., Macromol. Chem. Phys. 2006; 207:382.
2—Parkinson, M., Klimke, K., Spiess, H. W., Wilhelm, M., Macromol. Chem. Phys. 2007; 208:2128.
3—Pollard, M., Klimke, K., Graf, R., Spiess, H. W., Wilhelm, M., Sperber, O., Piel, C., Kaminsky, W., Macromolecules 2004; 37:813.
4—Filip, X., Tripon, C., Filip, C., J. Mag. Resn. 2005, 176, 239.
5—Griffin, J. M., Tripon, C., Samoson, A., Filip, C., and Brown, S. P., Mag. Res. in Chem. 2007 45, S1, S198.
6—Castignolles, P., Graf, R., Parkinson, M., Wilhelm, M., Gaborieau, M., Polymer 50 (2009) 2373.
7—Busico, V., Cipullo, R., Prog. Polym. Sci. 26 (2001) 443.
8—Busico, V., Cipullo, R., Monaco, G., Vacatello, M., Segre, A. L., Macromoleucles 30 (1997) 6251.
9—Zhou, Z., Kuemmerle, R., Qiu, X., Redwine, D., Cong, R., Taha, A., Baugh, D. Winniford, B., J. Mag. Reson. 187 (2007) 225.
10—Busico, V., Carbonniere, P., Cipullo, R., Pellecchia, R., Severn, J., Talarico, G., Macromol. Rapid Commun. 2007, 28, 1128.
11—Resconi, L., Cavallo, L., Fait, A., Piemontesi, F., Chem. Rev. 2000, 100, 1253.

j) Flexibility

The Flexibility value is calculated according to the equation below:

$$\text{Flexibility}=EAY*100000/(TSY*E)$$

wherein:
EAY is the elongation at yield value,
TSY is the tensile strength at yield value, in MPa and
E is the tensile modulus value, in MPa.

II—Inventive and Comparative Examples a) Inventive Examples

IE-1, IE-2, IE-3, IE-4 and IE-7 are polypropylene copolymers.

IE-5 is a polypropylene copolymer prepared by vis-breaking IE-2 in an extruder in the presence of peroxides.

IE-6 is a polypropylene copolymer prepared by vis-breaking IE-4 in an extruder in the presence of peroxides.

IE-8 and IE-9 are polypropylene copolymers prepared by vis-breaking IE-7 in an extruder in the presence of peroxides.

b) Comparative Examples

CE-1 is a polypropylene homopolymer with $MFR_2$ of 5 g/10 min and is manufactured and distributed by Borealis.

CE-2 is a polypropylene homopolymer with $MFR_2$ of 125 g/10 min and is manufactured and distributed by Borealis.

CE-3 is a polypropylene ethylene copolymer with $MFR_2$ of 8 g/10 min and melting point of 144° C., and is manufactured and distributed by Borealis.

CE-4 is a high flow polypropylene ethylene copolymer with $MFR_2$ of 28 g/10 min and is manufactured and distributed by Borealis.

CE-5 is polypropylene impact copolymer with $MFR_2$ of 13 g/10 min and is manufactured and distributed by Borealis.

CE-6 is a polypropylene homopolymer with $MFR_2$ of 450 g/10 min and is manufactured and distributed by Borealis.

CE-7 is a high flow polypropylene ethylene copolymer with $MFR_2$ of 110 g/10 min and is manufactured and distributed by Borealis.

CE-8 is a polypropylene ethylene copolymer with $MFR_2$ of 8 g/10 min and melting point of 140° C. and is manufactured and distributed by Borealis.

All comparative examples are produced using a Ziegler-Natta based catalyst system.

c) Preparation of Inventive Polypropylene Copolymers IE-1, IE-2, IE-3, IE-4 and IE-7

The polymerisation process for the preparation of the Inventive Examples according to the invention was carried out in a Borstar™ pilot plant having a pre-polymeriser, a $1^{st}$ loop reactor, a $1^{st}$ gas phase reactor (GPR1) and a $2^{nd}$ gas phase reactor (GPR2) all reactors being arranged in series. Such a process was carried out in the presence of either catalyst-1 or catalyst-2, depending of the case, in combination with triethylaluminium (TEAL) as co-catalyst and di-cyclopentyldimethoxy silane as external donor (donor D). The polymerisation conditions for the preparation of the Inventive examples as well as the type of catalyst are summarized in Table 1.

Catalyst-1

Catalyst-1 is prepared using an emulsion process. Such a process for the preparation of catalyst-1 is described in WO2010009827, example section, page 30 to 31.

Catalyst-2

Catalyst-2 is prepared by the following method:
a) First, 0.1 mol of $MgCl_2 \times 3$ mol EtOH were suspended under inert conditions in 250 ml of decane in a reactor at atmospheric pressure.
b) The solution was cooled to −15° C., then 300 ml of cold $TiCl_4$ were added while maintaining the temperature at said temperature.
c) The temperature of the slurry was increased slowly to 20° C. At this temperature 0.02 mol of dioctylphthalate (DOP) was added to the slurry.
d) After the addition of the dioctylphthalate (DOP), the temperature was raised to 135° C. during 90 minutes and the slurry was allowed to stand for 60 minutes.
e) Then 300 ml of $TiCl_4$ were added by keeping the temperature at 135° C. for 120 minutes.
f) The catalyst was then filtered and washed six times with 300 ml of heptane at 80° C.
g) Once the solid catalyst has been recovered, it was filtered and dried.

More details related to catalyst-2 preparation are described in EP491566, EP591224 and EP586390.

d) Preparation of Vis-Broken Polypropylene Copolymers IE-5, IE-6, IE-8 and IE-9

The vis-broken polypropylene copolymer was prepared by mixing a specific amount of polypropylene copolymer with a specific amount of peroxide Trigonox 101 in a co-rotating twin screw extruder type Coperion ZSK 40 having a screw diameter of 40 mm, and a L/D ratio of 38. The vis-broken polypropylene preparations were carried out at temperatures in the range of 170-190° C. and using a high intensity mixing screw configuration with two sets of kneading blocks. The vis-breaking length is defined as the ratio between the desired target $MFR_2$ and the initial $MFR_2$.

For the preparation of IE-5, IE-6, IE-8 and IE-9 the following amounts of peroxide were respectively used 50 ppm, 325 ppm, 860 ppm, 2000 ppm.

e) Preparation of Hot-Melt Adhesive Composition Containing Polyethylene Wax, Inventive (IE-13, IE-14, IE-15, IE-16 and IE-17) and Comparative Examples (CE-9, CE-10 and CE-11)

All the compositions have been prepared by mixing a specific amount of polypropylene copolymer with a specific amount of polyethylene wax in a co-rotating twin screw extruder type Coperion ZSK 40 having a screw diameter of 40 mm, and a L/D ratio of 38. The composition preparations were carried out at temperatures in the range of 170-190° C. and using a high intensity mixing screw configuration with two sets of kneading blocks. The percentages of polypropylene copolymer and polyethylene wax used in the preparation of the hot-melt adhesive compositions are mentioned in Table 4. The compositions included in the formulation 500 ppm of Irganox™ 1010 (Pentaerythrityl-tetrakis(3-(3',5'-di-tert. Butyl-4-hydroxyphenyl)-propionate), 500 ppm of Irgafos™ 168 (Tris (2,4-di-t-butylphenyl) phosphite) and 400 ppm of calcium stearate as additives. The polyethylene wax used in the preparation of the hot-melt adhesive compositions shown in Table 4 is a high molecular weight and high density polyethylene wax manufactured and distributed by Clariant under the name of Licowax™ PE 190 powder.

f) Preparation of Hot-Melt Adhesive Composition Containing Ethylene Based Plastomer (IE-10 and IE-12)

All the compositions have been prepared by mixing a specific amount of polypropylene copolymer with a specific amount of ethylene based plastomer in a co-rotating twin screw extruder type Coperion ZSK 40 having a screw diameter of 40 mm, and a L/D ratio of 38. The composition preparations were carried out at temperatures in the range of 170-190° C. and using a high intensity mixing screw configuration with two sets of kneading blocks. The percentages of polypropylene copolymer and ethylene based plastomer used in the preparation of the hot-melt adhesive compositions are mentioned in Table 5. The compositions also included in the formulation 500 ppm of Irganox™ 1010 (Pentaerythrityl-tetrakis (3-(3',5'-di-tert. Butyl-4-hydroxyphenyl)-propionate), 500 ppm of Irgafos™ 168 (Tris (2,4-di-t-butylphenyl) phosphite) and 400 ppm of calcium stearate as additives. The ethylene based plastomer used in the preparation of the hot-melt adhesive compositions shown in Table 5 is an ethylene based octene plastomer sold under the name of Queo™ 8230, which is manufactured and distributed by Borealis Plastomers (NL).

g) Preparation of Hot-Melt Adhesive Composition Containing Ethylene-Acrylate Copolymer (IE-11)

All the compositions have been prepared by mixing a specific amount of polypropylene copolymer with a specific amount of ethylene-acrylate copolymer in a co-rotating twin screw extruder type Coperion ZSK 40 having a screw diameter of 40 mm, and a L/D ratio of 38. The composition preparations were carried out at temperatures in the range of 170-190° C. and using a high intensity mixing screw configuration with two sets of kneading blocks. The percentages of polypropylene copolymer and ethylene-acrylate copolymer used in the preparation of the hot-melt adhesive compositions are mentioned in Table 5. The compositions also included in the formulation 500 ppm of Irganox™ 1010 (Pentaerythrityl-tetrakis(3-(3',5'-di-tert. Butyl-4-hydroxyphenyl)-propionate), 500 ppm of Irgafos™ 168 (Tris (2,4-di-t-butylphenyl) phosphite) and 400 ppm of calcium stearate as additives. The ethylene-acrylate copolymer used in the preparation of the hot-melt adhesive compositions shown in Table 5 is a copolymer of ethylene and methyl acrylate sold under the name of Elvaloy™ AC 1330 manufactured and distributed by DuPont.

From Table 2 it can be derived that the polypropylene copolymers-1 (inventive examples) show a higher Flexibility level and better elasticity level compared to the comparative examples. The elasticity level is determined by the storage modulus (G'23). Additionally, the thermal resistance, measured as Vicat-A and G'23/G'70, of the inventive examples keep a good level. Therefore the great advantage of the polypropylene copolymers-1 (inventive examples) over the comparative examples is that they present a good balance of improved elasticity level, Flexibility level and high heat resistance.

From Table 3 it can be derived that the polypropylene copolymers-2 (inventive examples) show higher Flexibility level and better elasticity level (G'23) compared to the comparative examples. Additionally, the thermal resistance of the inventive examples can be kept at a good level even if the melting temperature ($T_m$) is lower, in relation to the comparative examples.

From Table 4 it can be derived that the inventive adhesive compositions present a proper combination of heat resistance, flexibility and elasticity (G'23) compared to the comparative examples.

From Table 5 it can be derived that the presence of the ethylene based elastomer and of the ethylene-acrylate copolymer, respectively, improves the Flexibility and the elasticity (G'23) levels in the adhesive compositions keeping a good level of thermal resistance (Vicat-A). Thus a proper combination of heat resistance, flexibility and elasticity is obtained and as result an adhesive composition with improved overall bond performance.

TABLE 1

| Polymerization conditions for Inventive Examples. | | | | | | | |
|---|---|---|---|---|---|---|---|
| | | Unit | IE-1 | IE-2 | IE-3 | IE-4 | IE-7 |
| Pre-polymerisation | Catalyst | | Catalyst-1 | Catalyst-2 | Catalyst-1 | Catalyst-1 | Catalyst-2 |
| | Temperature | ° C. | 28 | 28 | 28 | 28 | 28 |
| | TEAL/Ti | mol/mol | 98 | 110 | 100 | 100 | 120 |
| | TEAL/Donor | wt %/wt % | 4 | 4 | 4 | 4 | 3 |
| | Residence time | min | 20 | 20 | 20 | 20 | 20 |
| | Donor | | D | D | D | D | D |

TABLE 1-continued

Polymerization conditions for Inventive Examples.

| | | Unit | IE-1 | IE-2 | IE-3 | IE-4 | IE-7 |
|---|---|---|---|---|---|---|---|
| Loop | Temperature | °C. | 70 | 70 | 70 | 70 | 70 |
| | H2/C3 | mol/kmol | 0.6 | 5.0 | 2.9 | 6.0 | 5.8 |
| | C2/C3 | mol/kmol | 26.0 | 17.2 | 23.8 | 23.8 | 21.3 |
| | Butene feed | Kg/h | 0 | 0 | 0 | 0 | 40 |
| | Split | % | 32 | 30 | 33 | 33 | 100 |
| | MFR | g/10 min | 0.7 | 6 | 3.9 | 8 | 7.4 |
| | XCS | wt % | 5.2 | 3 | 5.5 | 5.3 | 4.6 |
| | Residence time | h | 0.90 | 0.78 | 0.89 | 0.83 | 0.48 |
| | C2 content | wt % | 2.5 | 2.0 | 2.5 | 2.5 | 1.1 |
| GPR1 | Temperature | °C. | 80 | 75 | 80 | 80 | |
| | H2/C3 | mol/kmol | 9.0 | 19.6 | 36.0 | 71.6 | |
| | C2/C3 | mol/kmol | 38.0 | 62.6 | 34.0 | 36.9 | |
| | Split | % | 48 | 45 | 50 | 49 | |
| | MFR | g/10 min | 0.7 | 1.7 | 3.9 | 8.0 | |
| | XCS | wt % | 7.9 | 22 | 8.3 | 7.8 | |
| | Residence time | h | 1.7 | 2 | 2.8 | 2.9 | |
| | C2 content | wt % | 3.9 | 6.5 | 4.2 | 4.1 | |
| GPR2 | Temperature | °C. | 70 | 70 | 70 | 70 | |
| | H2/C3 | mol/kmol | 113 | 138 | 537 | 532 | |
| | C2/C3 | mol/kmol | 679 | 408 | 535 | 541 | |
| | Split | % | 20 | 25 | 17 | 18 | |
| | MFR | g/10 min | 0.7 | 1.5 | 3.9 | 7 | |
| | XCS | wt % | 24 | 43 | 20 | 20 | |
| | Residence time | h | 1.1 | 0.7 | 1.3 | 1.4 | |
| | C2 content | wt % | 8.5 | 15 | 8.2 | 8.5 | |

TABLE 2

Polypropylene copolymers-1 properties (inventive and comparative examples)*.

| | Unit | IE-1 | IE-2 | IE-3 | IE-4 | IE-5 | IE-6 | CE-1 | CE-2 | CE-3 | CE-4 | CE-5 |
|---|---|---|---|---|---|---|---|---|---|---|---|---|
| MFR$_2$ | g/10 min | 1.0 | 1.5 | 3.7 | 7.0 | 3.8 | 29.0 | 5.0 | 125 | 8.0 | 28.0 | 13.0 |
| Visbreaking length | | 1.0 | 1.0 | 1.0 | 1.0 | 2.5 | 4.1 | | 1.5 | | 1.0 | |
| Total comonomer | wt % | 8.0 | 15.0 | 8.2 | 8.0 | 15.0 | 8.0 | 0.0 | 0.0 | 3.5 | 3.6 | 8.3 |
| XCS | wt % | 22.0 | 44.0 | 20.0 | 20.0 | 44.0 | 19.2 | 3.0 | 2.2 | 8.0 | 6.1 | 18.0 |
| IV XCS | dl/g | 2.4 | 2.4 | 1.7 | 1.7 | 1.9 | 1.5 | n.m. | n.m. | n.m. | n.m. | 2.4 |
| C$_2$ XCS | wt % | 29.0 | 31.0 | 29.0 | 29.0 | 30.0 | 29.0 | n.m. | n.m. | n.m. | n.m. | 42.0 |
| T$_m$ | °C. | 140 | 150 | 142 | 140 | 150 | 142 | 162 | 162 | 144 | 150 | 164 |
| Tg matrix | °C. | -4.1 | -7.0 | -4.0 | -6.1 | -7.0 | -6.0 | 2.0 | 0.0 | -3.8 | -3.8 | -1.3 |
| Tg rubber | °C. | -54.0 | -46.0 | -50.0 | -50.0 | -47.0 | -54.0 | n.m. | n.m. | n.m. | n.m. | -59.0 |
| G'23° C. | MPa | 304 | 224 | 336 | 325 | 218 | 379 | 1051 | 991 | 533 | 562 | 627 |
| G'70° C. | MPa | 91 | 62 | 96 | 89 | 57 | 112 | 486 | 416 | 170 | 172 | 265 |
| G'70° C./G'23° C. | | 0.3 | 0.3 | 0.3 | 0.3 | 0.3 | 0.3 | 0.3 | 0.5 | 0.4 | 0.3 | 0.4 |
| Vicat-A | °C. | 117 | 94 | 119 | 118 | 94 | 117 | 150 | 148 | 127 | 125 | 150 |
| Tensile modulus, E | MPa | 600 | 342 | 647 | 618 | 331 | 592 | 1611 | 1810 | 961 | 1123 | 1216 |
| Tensile strength at break, TSB | MPa | 25.0 | 16.0 | 22.0 | 23.0 | 17.0 | 22.0 | 35.0 | 38.2 | 29.0 | 29.0 | 26.0 |
| Tensile strength at yield, TSY | MPa | 19.0 | 12.0 | 19.0 | 19.0 | 11.0 | 20.0 | 35.0 | 34.0 | 26.0 | 29.0 | 26.0 |
| Elongation at break, EAB | % | 440 | 532 | 430 | 492 | 521 | 520 | 408 | 11 | 507 | 175 | 57 |
| Elongation at yield, EAY | % | 15.0 | 21.0 | 13.0 | 13.0 | 20.0 | 14.0 | 8.8 | 7.5 | 12.0 | 12.0 | 7.0 |
| Flexibility | | 1.32 | 5.12 | 1.06 | 1.11 | 5.49 | 1.18 | 0.16 | 0.12 | 0.48 | 0.37 | 0.22 |

*n.m. = not measured

TABLE 3

Polypropylene copolymers-2 properties (inventive and comparative examples)*.

| | Unit | IE-7 | IE-8 | IE-9 | CE-1 | CE-2 | CE-3 | CE-4 | CE-6 | CE-7 |
|---|---|---|---|---|---|---|---|---|---|---|
| MFR$_2$ at 230° C., 2.16 kg | g/10 min | 6.0 | 96.0 | 310 | 5.0 | 125 | 8.0 | 28.0 | 450 | 110 |
| Visbreaking length | | 1.0 | 16.0 | 51.7 | | 1.5 | | 1.0 | 5.0 | 2.6 |
| C$_2$ matrix | wt % | 1.0 | | | 0.0 | | 3.5 | | | |
| C$_2$ total | wt % | 1.0 | 1.0 | 1.0 | 0.0 | 0.0 | 3.5 | 3.6 | 0.0 | 3.5 |
| C$_4$ | | | 9.0 | 9.0 | 9.0 | | | | | |
| XCS | wt % | 5.3 | 5.6 | 5.4 | 3.0 | 2.2 | 8.0 | 6.1 | 2.8 | 7.6 |

TABLE 3-continued

Polypropylene copolymers-2 properties (inventive and comparative examples)*.

| | Unit | IE-7 | IE-8 | IE-9 | CE-1 | CE-2 | CE-3 | CE-4 | CE-6 | CE-7 |
|---|---|---|---|---|---|---|---|---|---|---|
| IV XCS | dl/g | n.m. | n.m. | n.m. | n.m. | n.m. | n.m. | n.m. | n.m. | n.m. |
| $C_2$ XCS | wt % | n.m. | n.m. | n.m. | n.m. | n.m. | n.m. | n.m. | n.m. | n.m. |
| $T_m$ | °C. | 131 | 132 | 131 | 162 | 162 | 144 | 150 | 161 | 151 |
| Tg matrix | °C. | −3.0 | −2.0 | −2.0 | 2.0 | 0.0 | −3.8 | −3.8 | 0.1 | −3.6 |
| Tg rubber | °C. | n.m. | n.m. | n.m. | n.m. | n.m. | n.m. | n.m. | n.m. | n.m. |
| G'23° C. | MPa | 496 | 485 | 470 | 1051 | 991 | 533 | 562 | n.m. | 597 |
| G'70° C. | MPa | 138 | 130 | 125 | 486 | 416 | 170 | 172 | n.m. | 174 |
| G'70° C./G'23° C. | | 0.28 | 0.27 | 0.27 | 0.46 | 0.42 | 0.32 | 0.31 | n.m. | 0.29 |
| Vicat-A | °C. | 117 | 115 | 114 | 150 | 148 | 127 | 125 | 152 | 126 |
| Tensile modulus, E | MPa | 778 | 803 | 786 | 1611 | 1810 | 961 | 1123 | 1503 | 1193 |
| Tensile strength at break, TSB | MPa | 23.0 | 24.0 | 23.0 | 35.0 | 38.2 | 29.0 | 29.0 | 26.7 | 30.3 |
| Tensile strength at yield, TSY | MPa | 23.0 | 24.0 | 23.0 | 35.0 | 34.0 | 26.0 | 29.0 | 26.7 | 30.3 |
| Elongation at break, EAB | % | 450 | 354 | 206 | 408 | 170 | 175 | 175 | 3.2 | 168 |
| Elongation at yield, EAY | % | 11.0 | 12.0 | 11.0 | 8.8 | 7.5 | 12.0 | 12.0 | 3.2 | 11.0 |
| Flexibility | | 0.61 | 0.62 | 0.61 | 0.16 | 0.12 | 0.48 | 0.37 | 0.08 | 0.30 |

*n.m. = not measured

TABLE 4

Properties of adhesive compositions containing a polyethylene wax*.

| | Unit | IE-13 | IE-14 | IE-15 | IE-16 | IE-17 | CE-9 | CE-10 | CE-11 |
|---|---|---|---|---|---|---|---|---|---|
| IE-3 | wt % | 95.0 | 90.0 | 85.0 | 75.0 | 60.0 | | | |
| CE-8 | wt % | | | | | | | | 75.0 |
| CE-1 | wt % | | | | | | 95.0 | 75.0 | |
| Polyethylene wax | wt % | 5.0 | 10.0 | 15.0 | 25.0 | 40.0 | 5.0 | 25.0 | 25.0 |
| $MFR_2$ | g/10 min | 4.9 | 6.2 | 8.7 | 16.7 | 79.0 | 5.5 | 23.6 | 29.8 |
| Tc Polyethylene wax | °C. | 83.2 | 83.7 | 82.4 | | 113.5 | | | |
| Tc polypropylene copolymer | °C. | 105.0 | 105.5 | 105.6 | 107.7 | 106.4 | 115.0 | 113.0 | 107.5 |
| Tm wax | °C. | 126.0 | 125.5 | 126.4 | 127.3 | 126.6 | 126.0 | 127.7 | 126.1 |
| Tm polypropylene copolymer | °C. | 145.0 | 144.7 | 145.3 | 145.22 | 143.8 | 165.0 | 164.6 | 143.3 |
| G'23° C. | MPa | 375 | 369 | 381 | 401 | 506 | 838 | 844 | 508 |
| G'70° C. | MPa | 107 | 103 | 107 | 113 | 155 | 338 | 322 | 145 |
| G'70° C./G'23° C. | | 0.3 | 0.3 | 0.3 | 0.3 | 0.3 | 0.4 | 0.4 | 0.3 |
| Tg matrix | °C. | −4.3 | −4.8 | −4.4 | −4.2 | −4.3 | 1.4 | 3.0 | −5.9 |
| Tg rubber | °C. | −47.0 | −45.8 | −42.5 | −46.8 | −48.6 | n.m. | n.m. | n.m. |
| Tg wax | °C. | — | — | — | −124.8 | — | n.m. | −120.0 | −121.1 |
| Tensile modulus, E | MPa | 731 | 808 | 869 | 872 | 875 | 1856 | 1855 | 1033 |
| Tensile strength at break, TSB | MPa | 20.0 | 464 | 21.0 | 21.0 | 21.0 | 37.0 | 36.0 | 25.0 |
| Tensile strength at yield, TSY | MPa | 20.0 | 21.0 | 21.0 | 21.0 | 21.0 | 37.0 | 36.0 | 25.0 |
| Elongation at break, EAB | % | 526 | 464 | 302 | 99.0 | 10.0 | 88.0 | 5.0 | 56.0 |
| Elongation at yield, EAY | % | 15.0 | 13.0 | 12.0 | 11.0 | 10.0 | 7.0 | 5.0 | 9.0 |
| Flexibility | | 1.03 | 0.77 | 0.66 | 0.60 | 0.54 | 0.10 | 0.07 | 0.35 |

TABLE 5

Properties of adhesive compositions containing an ethylene-acrylate copolymer or an ethylene based plastomer*.

| | Unit | IE-10 | IE-11 | IE-12 |
|---|---|---|---|---|
| IE-4 | wt % | 83.0 | 85.0 | |
| IE-7 | wt % | | | 90.0 |
| Queo 8230 ™ | wt % | 17.0 | | 10.0 |
| Elvaloy ™ AC 1330 | wt % | | 15.0 | |
| $MFR_2$ | g/10 min | 9.0 | 7.5 | 8.3 |
| XCS | wt % | 32.3 | n.m. | 19.6 |
| IV XCS | dl/g | 1.19 | n.m. | 1.07 |
| $T_m$ | °C. | 141 | 140 | 131 |
| Tg matrix | °C. | −3.7 | −5.0 | −3.2 |
| Tg rubbber | °C. | −49.6 | −51.0 | −48.5 |
| G'23° C. | MPa | 290 | 326 | 365 |
| G'70° C. | MPa | 78 | 94 | 76 |
| G'70/G'23° C. | | 0.3 | 0.3 | 0.2 |
| Vicat-A | °C. | 103 | 114 | 113 |
| Tensile modulus, E | MPa | 490 | 620 | 694 |
| Tensile strength at break, TSB | MPa | 14.6 | 22.0 | 21.0 |
| Tensile strength at yield, TSY | MPa | 14.6 | 22.0 | 21.0 |
| Elongation at break, EAB | % | 579 | 550 | 634 |
| Elongation at yield, EAY | % | 16.5 | 16.0 | 12.0 |
| Flexibility | | 2.31 | 1.17 | 0.82 |

*n.m. = not measured

The invention claimed is:

1. An adhesive composition comprising at least one polypropylene copolymer, wherein such polypropylene copolymer has:
   a) at least one comonomer selected from the group consisting of ethylene and $C_4$-$C_{12}$ alpha-olefin,
   b) a total comonomer content in the range of 4.5 to 20.0 wt %, c) Vicat A temperature >80° C., as measured according to ISO 306,
d) storage modulus (G'23) in the range of 100 to 1000 MPa as measured at 23° C. according to ISO 6721-02 and ISO 6721-07,
e) melting temperature in the range of 120 to 160° C. as measured according to ISO 11357-3 and at least one of: a polymer other than the at least one polypropylene copolymer, a tackifying resin, a plasticizer, an additive, or a filler.

2. The adhesive composition according to claim 1 wherein the polypropylene copolymer has a tensile modulus (E) in the range of 200 to 1000 MPa as measured according to ISO 527 1 at 23° C.

3. The adhesive composition according to claim 1 wherein the polypropylene copolymer is a polypropylene copolymer-1 (PC-1) having at least one comonomer selected from the group consisting of ethylene, a $C_4$-$C_{12}$ alpha-olefin, and a combination thereof and wherein such polypropylene copolymer-1 (PC-1) has a Flexibility >0.8 which is calculated according to the equation:

$$Flexibility = EAY*100000/(TSY*E)$$

wherein:
EAY is the elongation at yield value,
TSY is the tensile strength at yield value, in MPa and
E is the tensile modulus value, in MPa.

4. The adhesive composition according to claim 3 wherein the polypropylene copolymer-1 (PC-1) has:
a) a glass transition temperature $T_{g1}$ in the range of −12 to −2° C. and
b) a glass transition temperature $T_{g2}$ in the range of −65 to −20° C.

5. The adhesive composition according to claim 3 wherein the polypropylene copolymer-1 (PC-1) has:
a) storage modulus (G'23) in the range of 150 to 450 MPa as measured at 23° C. according to ISO 6721-02 and ISO 6721-07 and
b) melting temperature in the range of 135 to 155° C. as measured according to ISO 11357-3.

6. The adhesive composition according to claim 1 wherein the polypropylene copolymer is a polypropylene copolymer-2 (PC-2) comprising units derived from propylene, ethylene and at least one comonomer selected from linear or branched $C_4$-$C_{12}$ alpha-olefin and wherein such polypropylene copolymer-2 (PC-2) has:
a) a glass transition temperature Tg in the range of −12 to 0° C. and
b) a total comonomer content in the range of 6.0 to 15.0 wt %.

7. The adhesive composition according to claim 6 wherein the polypropylene copolymer-2 (PC-2) has:
a) storage modulus (G'23) in the range of 300 to 600 MPa as measured at 23° C. according to ISO 6721-02 and ISO 6721-07 and
b) melting temperature in the range of 125 to 135° C. as measured according to ISO 11357-3.

8. The adhesive composition according to claim 6 wherein the polypropylene copolymer-2 (PC-2) has a tensile modulus (E) in the range of 500 to 1000 MPa as measured according to ISO 527-1 at 23° C.

9. The adhesive composition according to claim 6 wherein the comonomers in the polypropylene copolymer-2 (PC-2) are ethylene and $C_4$ alpha-olefin.

10. The adhesive composition according to claim 1 wherein the at least one polymer other than the at least one polypropylene copolymer has a) melting temperature <120° C. as measured according to ISO 11357-3,
b) storage modulus (G'23) <50 MPa as measured at 23° C. according to ISO 6721-02 and ISO 6721-07,
c) density <0.96 g/cm³ as measured according to ISO 1183D and
d) an $MFR_2$ in the range of 0.20 to 2000 g/10 min as measured according to ISO 1133.

11. The adhesive composition according to claim 1 wherein the adhesive composition has:
a) at least one polymer other than the at least one polypropylene copolymer present in the range of 0.01 to 50.0 wt %, the percentage of the at least one polymer other than the at least one polypropylene copolymer is calculated based on the total amount of polypropylene copolymer and of at least one polymer other than the at least one polypropylene copolymer comprised in the adhesive composition and
b) Flexibility >0.5 and which is calculated according to the equation:

$$Flexibility = EAY*100000/(TSY*E)$$

wherein:
EAY is the elongation at yield value,
TSY is the tensile strength at yield value, in MPa and
E is the tensile modulus value, in MPa.

12. An article comprising an adhesive composition and at least one substrate, wherein the adhesive composition comprises
at least one polypropylene copolymer, wherein such polypropylene copolymer has:
a) at least one comonomer selected from the group consisting of ethylene and $C_4$-$C_{12}$ alpha-olefin,
b) a total comonomer content in the range of 4.5 to 20.0 wt %,
c) Vicat A temperature >80° C., as measured according to ISO 306,
d) storage modulus (G'23) in the range of 100 to 1000 MPa as measured at 23° C. according to ISO 6721-02 and ISO 6721-07,
e) melting temperature in the range of 120 to 160° C. as measured according to ISO 11357-3; and
at least one of: a polymer other than the at least one polypropylene copolymer, a tackifying resin, a plasticizer, an additive, or a filler.

13. A process to produce an article wherein the process comprises at least the step of applying at least one adhesive composition on at least one surface of at least one substrate, wherein the adhesive composition comprises
at least one polypropylene copolymer, wherein such polypropylene copolymer has:
a) at least one comonomer selected from the group consisting of ethylene and $C_4$-$C_{12}$ alpha-olefin,
b) a total comonomer content in the range of 4.5 to 20.0 wt %,
c) Vicat A temperature >80° C., as measured according to ISO 306,
d) storage modulus (G'23) in the range of 100 to 1000 MPa as measured at 23° C. according to ISO 6721-02 and ISO 6721-07,
e) melting temperature in the range of 120 to 160° C. as measured according to ISO 11357-3; and
at least one of: a polymer other than the at least one polypropylene copolymer, a tackifying resin, a plasticizer, an additive, or a filler.

14. A method comprising preparing an article according to claim 12 with an adhesive composition, wherein the adhesive composition comprises
at least one polypropylene copolymer, wherein such polypropylene copolymer has:
a) at least one comonomer selected from the group consisting of ethylene and $C_4$-$C_{12}$ alpha-olefin,
b) a total comonomer content in the range of 4.5 to 20.0 wt %,
c) Vicat A temperature >80° C., as measured according to ISO 306,
d) storage modulus (G'23) in the range of 100 to 1000 MPa as measured at 23° C. according to ISO 6721-02 and ISO 6721-07,
e) melting temperature in the range of 120 to 160° C. as measured according to ISO 11357-3; and
at least one of: a polymer other than the at least one polypropylene copolymer, a tackifying resin, a plasticizer, an additive, or a filler.

15. A process to prepare an adhesive composition according to claim 1 comprising combining at least one polypropylene copolymer with at least one of: a polymer other than the at least one polypropylene copolymer, a tackifying resin, a plasticizer, an additive or a filler.

16. The adhesive composition according to claim 2 wherein the polypropylene copolymer is a polypropylene copolymer-1 (PC-1) having at least one comonomer selected from the group consisting of ethylene, a $C_4$-$C_{12}$ alpha-olefin, and a combination thereof and wherein such polypropylene copolymer-1 (PC-1) has a Flexibility >0.8 which is calculated according to the equation:

Flexibility=EAY*100000/(TSY*$E$)

wherein:
EAY is the elongation at yield value,
TSY is the tensile strength at yield value, in MPa and
E is the tensile modulus value, in MPa.

17. The adhesive composition according to claim 16 wherein the polypropylene copolymer-1 (PC-1) has:
a) a glass transition temperature $T_{g1}$ in the range of −12 to −2° C. and
b) a glass transition temperature $T_{g2}$ in the range of −65 to −20° C.

18. The adhesive composition according to claim 4 wherein the polypropylene copolymer-1 (PC-1) has:
a) storage modulus (G'23) in the range of 150 to 450 MPa as measured at 23° C. according to ISO 6721-02 and ISO 6721-07 and
b) melting temperature in the range of 135 to 155° C. as measured according to ISO 11357-3.

19. The adhesive composition according to claim 2 wherein the polypropylene copolymer is a polypropylene copolymer-2 (PC-2) comprising units derived from propylene, ethylene and at least one comonomer selected from linear or branched $C_4$-$C_{12}$ alpha-olefin and wherein such polypropylene copolymer-2 (PC-2) has:
a) a glass transition temperature Tg in the range of −12 to 0° C. and
b) a total comonomer content in the range of 6.0 to 15.0 wt %.

20. The adhesive composition according to claim 7 wherein the polypropylene copolymer-2 (PC-2) has a tensile modulus (E) in the range of 500 to 1000 MPa as measured according to ISO 527-1 at 23° C.

* * * * *